United States Patent [19]

Dale et al.

[11] Patent Number: 5,099,764
[45] Date of Patent: Mar. 31, 1992

[54] PROPULSION UNIT FIREABLE FROM AN ENCLOSURE

[75] Inventors: Malcolm K. Dale, Delmar; Thomas O'Brien, Saratoga Spgs.; David Wilson, Menands; Christopher Rinaldi, Ballston Lake, all of N.Y.

[73] Assignee: The United States of America as represented by the Secretary of the Army, Washington, D.C.

[21] Appl. No.: 709,908

[22] Filed: May 30, 1991

[51] Int. Cl.$^5$ .................. F02K 9/10; B63H 11/00; F42B 15/10
[52] U.S. Cl. .................. 102/374; 60/221; 89/1.701
[58] Field of Search .............. 89/1.7, 1.704, 1.703, 89/1.706, 1.816, 1.818, 1.701, 7; 102/374, 375, 440; 60/227, 221, 222

[56] References Cited

U.S. PATENT DOCUMENTS

| | | | |
|---|---|---|---|
| 3,252,281 | 5/1966 | Everett et al. | 60/227 |
| 3,800,656 | 4/1974 | Schnäbele | 89/1.701 |
| 3,815,469 | 6/1974 | Schubert et al. | 89/1.703 |
| 4,091,709 | 5/1978 | Spurk | 89/1.7 |
| 4,392,412 | 7/1983 | Schmidt et al. | 89/1.816 |
| 4,426,909 | 1/1984 | Carter | 89/1.816 |
| 4,432,202 | 2/1984 | Betts et al. | 60/221 |
| 4,554,860 | 11/1985 | Johansson et al. | 89/1.7 |

Primary Examiner—David H. Brown
Attorney, Agent, or Firm—Anthony T. Lane; Edward Goldberg; Michael C. Sachs

[57] ABSTRACT

A recoilless propulsion unit fireable from an enclosure utilizes a releasably sealed multi-holed nozzle member to expel a fluid therefrom by a closed-breech type piston that is activated by a propellant charge. The propulsion unit after firing has minimum impact of overpressure, noise on both the launch crew and has no flash or smoke signature emitted therefrom.

4 Claims, 3 Drawing Sheets

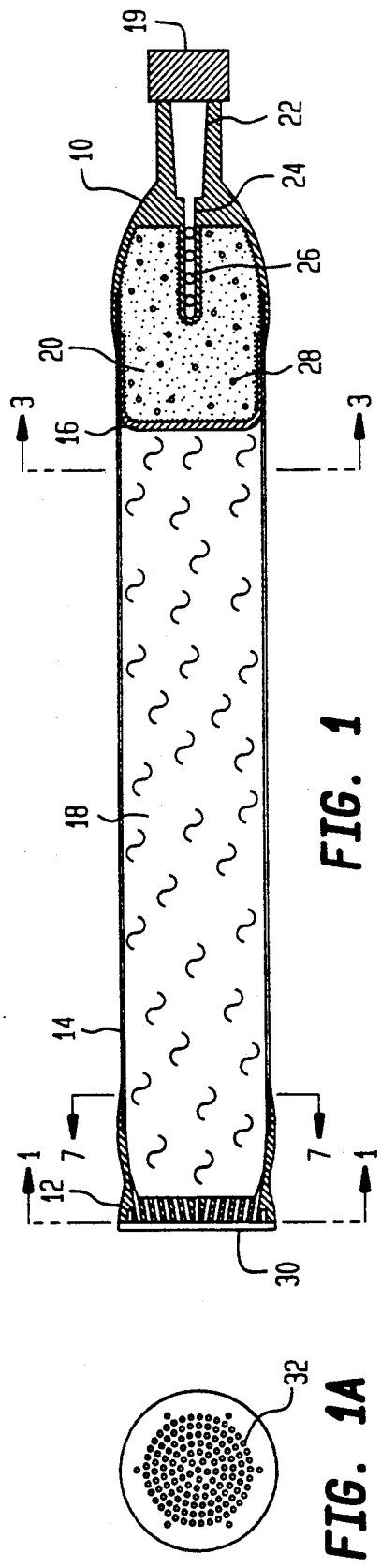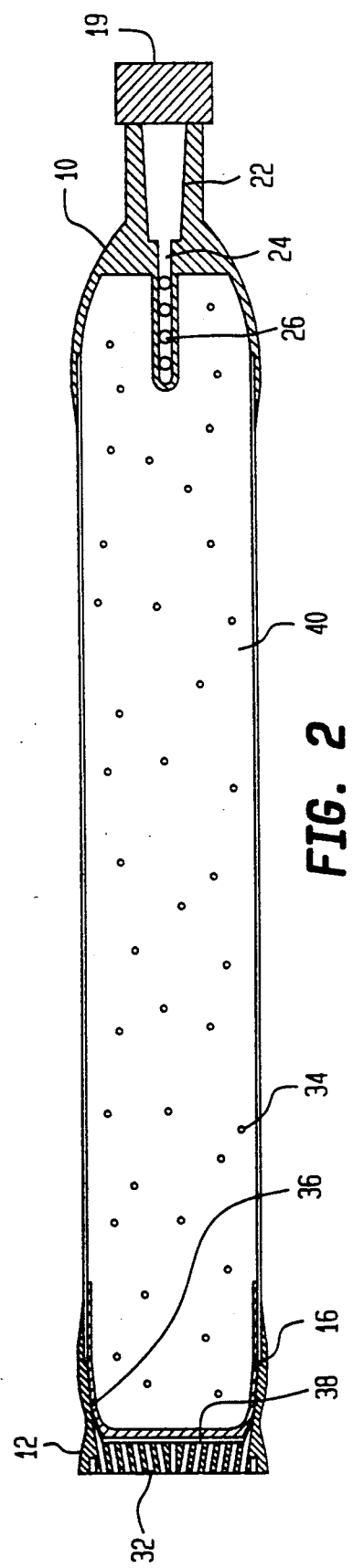

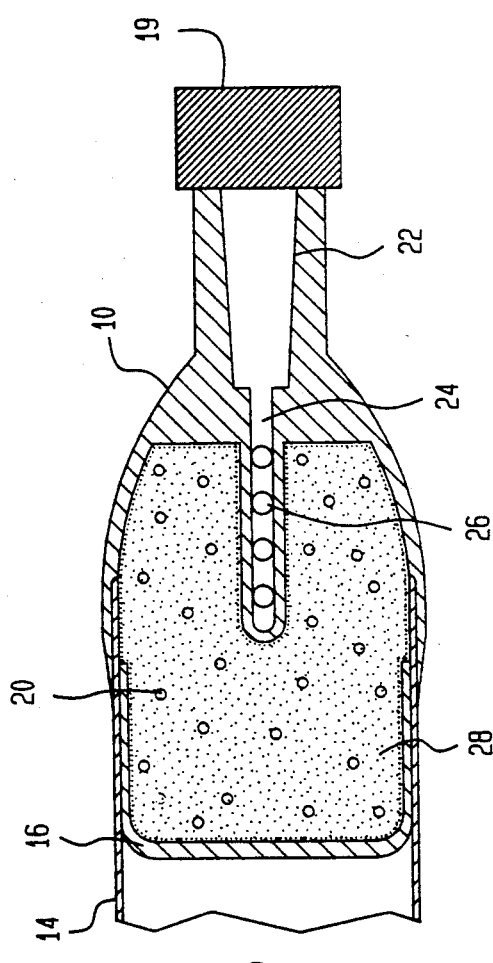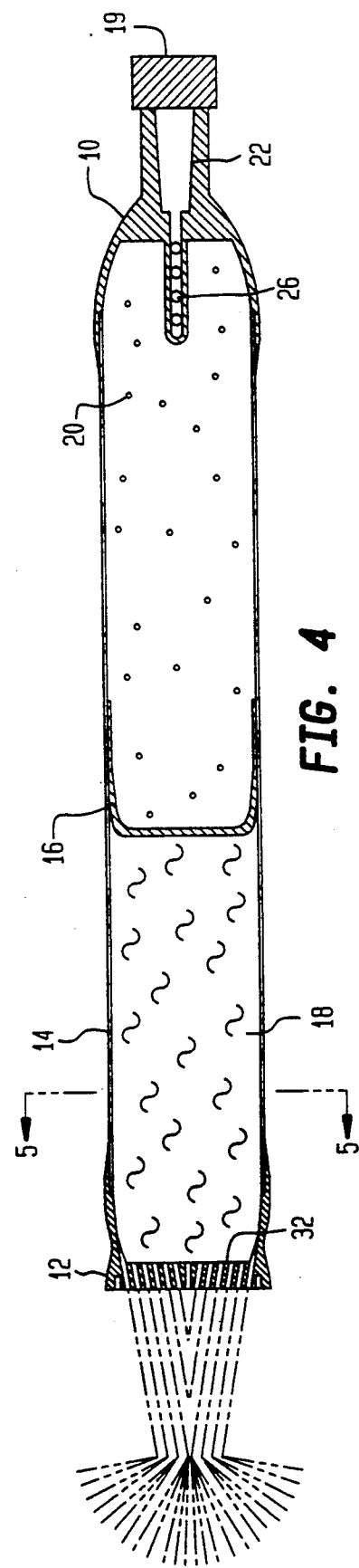

PROPULSION UNIT FIREABLE FROM AN ENCLOSURE

GOVERNMENTAL INTEREST

The invention described herein may be manufactured, used and licensed by or for the Government for Governmental purposes without the payment to us of any royalties thereon.

BACKGROUND OF THE INVENTION

There has always been a problem when firing medium to large caliber projectiles from a small enclosure from any type of launching device, having low location signature of flash and/or smoke, with minimum impact of overpressure and noise on both the launch crew and their environment. Conventional closed-breech weapons cause severe overpressure and emit toxic fumes when the projectile propellant gases expand from the muzzle as well as producing a recoil problem. Prior art recoilless weapons eliminate the recoil problem but release additional propellant gases from the rear of the weapon thereby increasing the overpressure, toxic fumes, and signature problems. Conventional prior art rockets also produce severe signature and overpressure problems when launched from an open tube type launcher. The overpressure developed when firing out of an open window in a normal urban sized room indicate pressures are sufficiently high to cause internal injury to the gunner. Also, repeated firings within a short period of time produce enough toxic fumes to make the enclosure uninhabitable.

DESCRIPTION OF PRIOR ART

U.S. Pat. Nos. 3,771,417 and 3,779,130 titled Recoilless and Detonation-Free Projectile Firing Device and Launching Tube For Projectiles and Missiles respectively are both fireable from an enclosure. These inventions use a manportable expendable 67 mm weapon with a low signature achieved by the inclusion of a double "trapped piston" design. These two patents rely on two pistons pushing masses traveling in opposite directions. Each mass has to have the same momentum or the launcher would recoil in either direction greatly affecting the accuracy of the system and safety of the gunner. The simultaneous reaction of these pistons is crucial for the operation of this system to be successful. The recoil mass that these systems use, typically small plastic discs, leaves a noticeable signature as to where the system was fired from. These discs can produce significant damage to objects or personnel in their path when they stick together on exit from a fired weapon. This condition is highly undesireable in the battlefield environment. It is also undesireable because it leaves a pressurized launch tube on the gunners shoulder which must be discarded.

U.S. Pat. No. 4,432,202 titled Flow-through Pyrotechnic Delay describes a device that ejects a liquid through a single orifice nozzle. The use of a single orifice nozzle generates a jet of fluid that is hazardous to the immediate area to the rear of the jet. Enclosure tests with this prior art system showed a jet of high velocity liquid capable of putting holes through walls. This condition is highly undesireable because it puts the gunner in an environment where fragmenting material may injure him. In addition, the expelled jet is a lethal slug of liquid in itself.

SUMMARY OF THE INVENTION

The present invention relates to a medium to large projectile which can be launched without recoil, has a low firing signature and minimum impact on both the crew and the environment. The present invention can be safely launched from a small enclosure or room.

An object of the present invention is to provide a propulsion unit to which a projectile can be attached that is fireable from enclosures.

Another object of the present invention is to provide a propulsion unit to which a projectile can be attached and fired which has no flash or smoke ejected from it.

Another object of the present invention is to provide a propulsion unit to which a projectile can be attached and fired without leaving a firing signature and where the consistency of the propulsion is highly predictable.

Another object of the present invention is to provide a propulsion unit fireable from an enclosure with minimum impact of overpressure and noise on both the launch crew and their environment.

Another object of the present invention is to provide a propulsion unit fireable from an enclosure which acts like a closed breech gun and where the pressure at which the propellant is allowed to reach is regulated by the burst pressure of the system.

Another object of the present invention is to provide a propulsion unit fireable from an enclosure which acts like a closed breech gun but does not cause overpressure or emit toxic gases near the gunner.

A further object of the present invention is to provide a propulsion unit fireable from an enclosure to which a projectile is attached and can be fired without smoke, flash, hazard to the gunner and without recoil.

For a better understanding of the present invention, together with other and further objects thereof, reference is made to the following descriptions taken in connection with the accompanying drawings.

BRIEF DESCRIPTION OF THE DRAWINGS

FIG. 1 is a longitudinal diametral cross-sectional view of the propulsion unit and the projectile before ignition.

FIG. 1A is an end view of the nozzle of the propulsion unit taken along line 1—1 of FIG. 1.

FIG. 2 is a longitudinal diametral cross-sectional view of the propulsion unit and the projectile attached thereto after ignition.

FIG. 3 is an enlarged view of the front portion of the propulsion unit shown FIG. 1.

FIG. 4 is a longitudinal diametral cross-sectional view of a propulsion unit with convergent holes.

Throughout the following description, like reference numerals are used to denote like parts of the drawings.

DETAILED DESCRIPTION OF THE PREFERRED EMBODIMENTS

Figure 7:
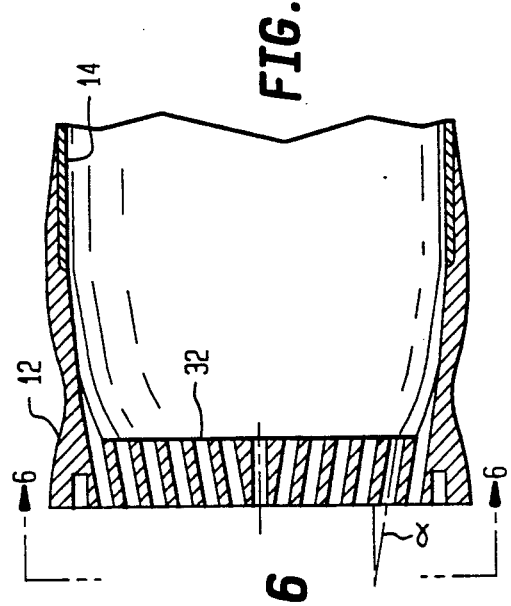
FIG. 7 is a partial enlarged cross-sectional view of the nozzle end of the propulsion unit when using a straight-holed nozzle end, instead of the convergent-holed nozzle end of FIG. 1.

Referring now to FIG. 1, a conically-shaped forward end dome member 10 is fixedly attached in axial alignment to a multi-holed cup-shaped rear nozzle member 12 by a hollow cylindrical tube 14. Slidably positioned within the tube 14 proximate to the end dome 10 is a closed end cylindrical piston member 16 which separates a fluid 18 from a propellant charge 20. A warhead attachment 19 is operatively positioned in front of the end dome 10. The propellant charge 20 is disposed intermediate the end dome member 10 and the piston 16. A primer 22 axially positioned in the forward end of end dome 10 has a flash tube 24 operatively attached to the primer 22. The flash tube 24 has a multiple number of holes 26 therein which permit gases from primer 22 to uniformly enter propellant chamber volume 28. A burst disc 30 is operatively positioned against the rear end of the nozzle member 12. FIG. 1A shows the multiple nozzle hole pattern in nozzle member 12.

Referring now to FIGS. 1 and 2, in operation propellant charge 20 is ignited by hot gases generated by primer 22. The hot gases pass through the flash tube holes 24 uniformly about propellant charge 20. Once propellant charge 20 has been flashed by flash tube 24, the charge begins to ignite. The propellant gases in chamber 28 generate a pressure on piston 16 which force is transferred to the fluid 18. The propellant gases 34 and fluid pressure rise until burst disc 30 is ruptured by the fluid 18 in nozzle holes 32. At this time the expanding high pressure propellant gases 34 cause fluid 18 to be expelled by means of nozzle holes 32 into the atmosphere. The momentum of the expelled fluid gives the unit its propulsion. When piston 16 reaches the front end of nozzle member 12 and all fluid is expelled from the system, propulsion forces cease and the unit is in free flight. Piston 16 is designed in such a fashion as to produce a seal between itself and nozzle 12 when they come in contact with each other. This seal prevents propellant gases 34 from being expelled from the propulsion unit. The piston 16 and the nozzle member 12 are designed in such a fashion that the two parts mate together to form a wedge between the two contact surfaces. Once all the fluid 18 has been expelled from the system, the piston 16 is in contact with the external nozzle wall surface 36 and the internal nozzle hole surface 38. After the fluid 18 is depleted, the pressure gradient between the propellant gases 34 in the expanded chamber volume 40 and the open atmospheric pressure in holes 32 provide sufficient force to deform the piston 16 into the contours of the holes 32 of the nozzle member 12 forming a hermetic seal therebetween.

The propellant chamber volume 28 in FIG. 1, prior to ignition, and the propellant chamber volume 40 of FIG. 2, after propellant charge 20 burning, describe a "closed breech" system. Referring to FIG. 1, in order to insure proper propellant burn pressure and temperature, burst disc 30 is used to regulate the pressure of the propellant 20. The loading density of the propellant 20 is regulated by the volume between piston 16 and the end dome 10. The length, diameter and number of holes 26 in flash tube 24 can be varied to facilitate the ignition of the propellant 20. As piston 16 moves down tube 14, the chamber volume 28 increases proportionally to the amount of fluid 18 displaced. This increase in chamber volume directly affects the burning characteristics of the propellant charge 20. Since the rate at which fluid 18 is expelled from the unit is directly proportional to the number of holes 32 in nozzle 12 and the pressure acting on piston 16 in chamber volume 28. A propellant 20 can be designed in such a fashion as to provide a known pressure curve for the system.

Figure 5:
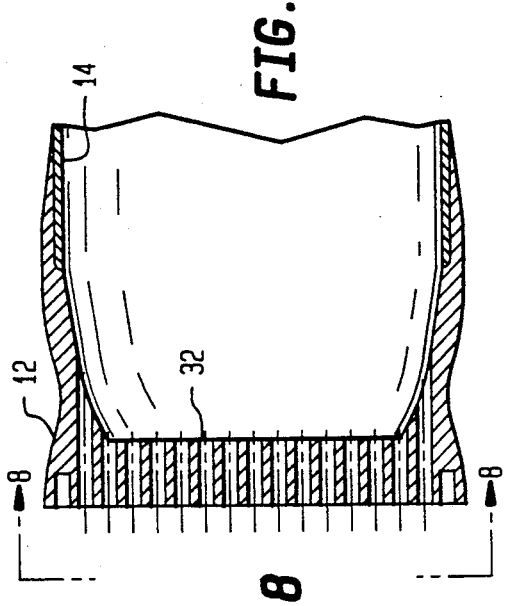
FIG. 5 is a partial enlarged cross-sectional view of the nozzle end of the propulsion unit of FIG. 4.
Figure 8:
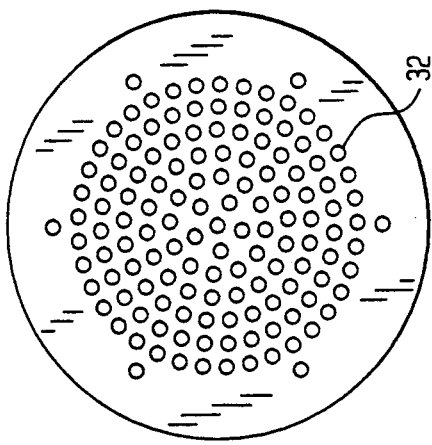
FIG. 8 is an end view of the straight-holed nozzle member taken along line 8—8 of FIG. 7.
Figure 6:
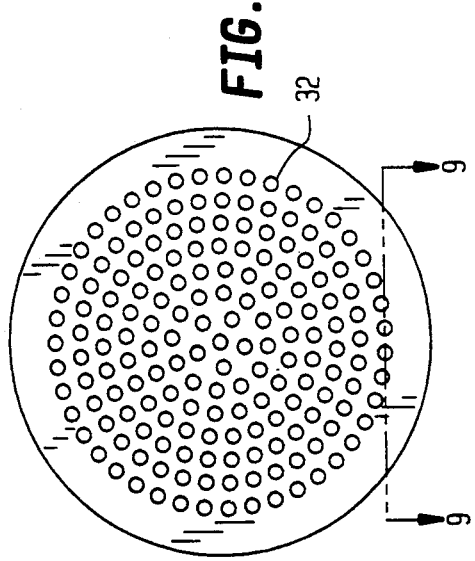
FIG. 6 is an end view of the convergent-holed nozzle member taken along line 6—6 of FIG. 5.
Figure 9:
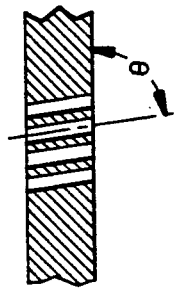
FIG. 9 is a partial enlarged cross-sectional view of the nozzle end of the propulsion unit showing a tangentially canted hole arrangement having an angle $\theta$ with respect to the circumference of the nozzle member.

Referring now to FIG. 4, the hole pattern 32 is selected in such a fashion as to disperse the fluid 18 in as many jets as possible without adversely affecting the flow characteristics of the fluid 18. Hole patterns are selected in such a fashion as to optimize the exit area of the nozzle 12. The greater the exit area the more optimal the propulsion of the device. The thickness of the nozzle plate 12 is determined by the structural integrity of the hole pattern and the flow characteristics of the fluid 18 through holes 32. The holes 32 can be directed in a variety of fashions. FIGS. 5 and 6 show holes that are canted at an angle $\alpha$. FIGS. 7 and 8 show holes that are straight and parallel to each other. The holes in FIG. 7 rely upon friction between the fluid jet and the atmosphere as well as the expansion of the fluid to break up the jet. The holes of FIGS. 4 and 5 converge the jets on themselves so that they impact each other. The impact diffuses the jet and causes a mushrooming effect on the flow. The product of both cases is that the fluid particles are widely dispersed in the atmosphere. A generic fluid such as water produces a mist that is not easily detectable. The holes 32 in FIGS. 4-8 can also be angled tangentially at some angle $\theta$ as shown in FIG. 9 to produce spin on the system. The amount of spin increases with angle $\theta$.

While a specific embodiment of the invention has been shown and described in detail to illustrate the application of the principles of the invention, it will be understood that the invention may be embodied otherwise without departing from such principles.

What is claimed is:

1. A propulsion unit for a weapon, suitable for use in firing a warhead by personnel in confined areas where gasseous smoke, noise and flash signature of a weapon are all desired to be reduced, said propulsion unit comprising:

- tube means comprising a hollow cylindrical tube member;
- end dome means sealably attached at one end of said tube member, and nozzle means sealably attached at the other end of said tube member; said nozzle means having a plurality of holes therein which would permit the escape of fluid;
- piston means slidably disposed in said tube means comprising a cup-shaped member snugly fitting within said tube means with the open face of the cup-shaped member facing in the direction of said end dome;
- propellant means within said tube means, between said piston means and said end dome means;
- fluid means within said tube means, between said nozzle means and said piston means;
- rupture disc means attached to and covering said nozzle means; and which disc means can rupture under pressure from the fluid means during firing of the weapon;
- flash tube means in said end dome means, said flash tube means positioned so that portions of it are outside the end dome means and portions of it lead into the propellant means, being coaxial to said tube means, and being essentially hollow and having holes therein for contacting said propellant means;

primer means in said flash tube means leading from outside said end dome means, for igniting said propellant means;

warhead for said propulsion unit, axially attached to and positioned forward of said end dome means and said flash tube means;

said weapon operative to be fired by igniting said primer means to fire said propellant means, whereby recoil action in the weapon is cushioned by said fluid means as the piston means slides towards said nozzle means, whereby gasseous discharges are contained within said tube means as the piston means slams into and essentially thereby seals said nozzle means, whereby open flash of propellant burning is essentially hidden in said tube means and whereby noise of the firing is significantly reduced as burning propellant explosion is largely contained within said propulsion unit.

2. A propulsion unit as recited in claim 1 wherein the holes of said nozzle means are positioned in a pattern having an angle $\alpha$ with respect to the longitudinal axis of said propulsion unit.

3. A propulsion unit as recited in claim 1 wherein the holes of said nozzle means are positioned in a pattern having an angle $\theta$ with respect to the circumference of said nozzle means thereby providing spin to the said propulsion unit.

4. A propulsion unit as recited in claim 1 wherein said fluid means includes water.

* * * * *